(12) United States Patent
Price

(10) Patent No.: US 6,671,992 B1
(45) Date of Patent: Jan. 6, 2004

(54) BIRD REMOVAL DEVICE

(75) Inventor: Charles Stephen Price, Louisville, KY (US)

(73) Assignee: Avian Systems Corporation, Louisville, KY (US)

( * ) Notice: Subject to any disclaimer, the term of this patent is extended or adjusted under 35 U.S.C. 154(b) by 0 days.

(21) Appl. No.: 09/577,894

(22) Filed: May 24, 2000

Related U.S. Application Data

(60) Provisional application No. 60/135,978, filed on May 26, 1999.

(51) Int. Cl.[7] .............................................. A01M 29/00
(52) U.S. Cl. ............................................................. 43/1
(58) Field of Search .............................. 43/1; 116/22 A; 52/101; 119/903; 124/18, 19, 20.1

(56) References Cited

U.S. PATENT DOCUMENTS

| | | |
|---|---|---|
| 1,357,032 A | 10/1920 | Davis |
| 2,485,148 A * | 10/1949 | Fralin ........................... 52/101 |
| 2,488,509 A | 11/1949 | Lewin |
| 3,416,266 A * | 12/1968 | Eron ............................ 52/101 |
| 3,618,585 A | 11/1971 | Allison |
| 4,074,653 A | 2/1978 | Pember |
| 4,109,605 A | 8/1978 | Bachli |
| 4,131,079 A | 12/1978 | Rousseau, Jr. et al. |
| 4,144,832 A | 3/1979 | Dahl |
| 4,597,357 A | 7/1986 | LeMessurier |
| 4,598,660 A | 7/1986 | Konzak |
| 4,656,770 A | 4/1987 | Nuttle |
| 4,841,914 A | 6/1989 | Chatten |
| 4,965,552 A | 10/1990 | Price et al. |
| 5,092,088 A | 3/1992 | Way |
| 5,167,099 A | 12/1992 | Nelson |
| 5,341,759 A | 8/1994 | Hood |
| 5,421,783 A | 6/1995 | Kockelman et al. |
| 5,694,913 A | 12/1997 | Parrott |
| 5,713,160 A * | 2/1998 | Heron ........................... 52/101 |
| 5,845,607 A | 12/1998 | Kastner et al. |
| 5,918,404 A * | 7/1999 | Ohba .............................. 43/1 |
| 5,977,866 A | 11/1999 | Joseph, Jr. et al. |

\* cited by examiner

Primary Examiner—Kurt Rowan
(74) Attorney, Agent, or Firm—Camoriano and Associates; Theresa Fritz Camoriano

(57) ABSTRACT

A mechanical bird removal device, wherein a bow string is pulled taut, by means of a tow line, across an area to be swept free of unwanted birds. Upon activation of the device, the tow line is allowed to momentarily "free wheel", thus releasing the bow string to sweep across the area, thus scaring or physically forcing the birds away. Once the area has been swept free of birds, the tow line once again is reeled in and thus resets the bow string for the next cycle.

17 Claims, 7 Drawing Sheets

BIRD REMOVAL DEVICE

This application claims priority from U.S. Provisional Patent Application No. 60/135978 filed May 26, 1999, which is hereby incorporated by reference.

BACKGROUND OF THE INVENTION

The present invention relates to a bird removal device, and, more specifically, to a mechanical device that moves and physically forces or frightens birds from a roof, ledge, or other object on which they are perched.

In urban environments, bird "infestations" can present a variety of problems. For example, near airports, birds are a hazard to arriving and departing planes. Birds and bird droppings can also present substantial health hazards to the community at large. For example, birds carry many diseases that can be transmitted to humans.

Thus, a wide variety of bird removal systems has been developed for dealing with unwanted birds. Many such devices use sirens, alarms, or similar sound devices to frighten the birds. However, birds may become accustomed to such devices and thus are no longer frightened away. Another alternative is to introduce chemical substances into the birds' food supply, but these chemicals may also adversely affect other wildlife.

SUMMARY OF THE INVENTION

It is therefore the object of the present invention to provide a simple device that removes unwanted birds from a roof, ledge, tree, or similar area.

It is a further object of the present invention to provide a bird removal device that will consistently serve its purpose regardless of the birds' familiarity with the device.

It is still a further object of the present invention to provide a bird removal device that is non-lethal and will not adversely affect other wildlife.

These and other objects and advantages of the present invention will become apparent upon review of the following description.

The present invention produces physical movement which literally forces the birds to move or frightens them to do so. Normally, both effects are produced simultaneously.

In a preferred embodiment, a long bow string is stretched, so it is taut between two anchor points, using an elastic cord or some other mechanism such as a spring, a weight on a pulley, or even a fiberglass rod. A tow line is attached to the bow string, and this tow line pulls back on the bow string, moving the bow string to a cocked position. One end of the tow line is secured to the bow string, and the other end is attached to a wind-up spool which is part of a retractor mechanism.

Upon activation, the wind-up spool is allowed to unwind freely, which allows the bow string to snap back, sweeping the area of birds and preferably making a loud noise. After releasing the bow string, the device begins reeling the tow line back up, making a clicking noise, slowly sweeping the area again, and re-cocking the bow string. Thus, the bow string swings swiftly across the area to be kept free of birds, physically forcing the birds off their perch regardless of how comfortable or familiar they may have become with the device. In order to accomplish this, the bow string should sweep across the area at a height which is low enough to make contact with the birds perching in the area. Typically, the bow string would sweep a path which is substantially parallel to and within one foot of the perching surface. Furthermore, the bow string sweeps back again over the surface as it is brought back to the cocked position, and, while doing so, the retractor mechanism is emitting an audible clicking sound which further serves to scare the birds away.

There may be several configurations to accomplish the desired effect of physically removing unwanted birds. In one such configuration, tree limbs are shaken to both remove the birds and scare them away. In this case, one or more tree limbs are pulled back by the tow line (instead of pulling back on a bow string). When the mechanism is triggered, the tow string unwinds freely from the take-up spool, allowing the tree limb(s) to snap back. Other configurations may involve moving frightening objects such as tinsel cord or a cord with streamers, moving noise making objects, or multiple bow string lines and pulleys in order to sweep multiple areas.

The activation of the device of the present invention may be accomplished in any of a number of ways. It can be activated manually, by a timer, a motion sensor, a heat sensor, or even a sound sensor such as that described in U.S. Pat. No. 4,965,552, which is hereby incorporated by reference. The sound sensor "listens" for environmental sounds in the vicinity of the device. It compares the sounds it hears against a database, and, when it detects the same sound as that of the unwanted bird species, it generates a signal which may be used to activate the device of the present invention.

While the embodiment of the invention shown herein is a simple bird removal device, it will be clear to those skilled in the art that it can also be used with various other configurations having various bow strings, pulleys, and adjustments so as to deter birds in any given area.

DESCRIPTION OF THE PREFERRED EMBODIMENTS

Figure 1:
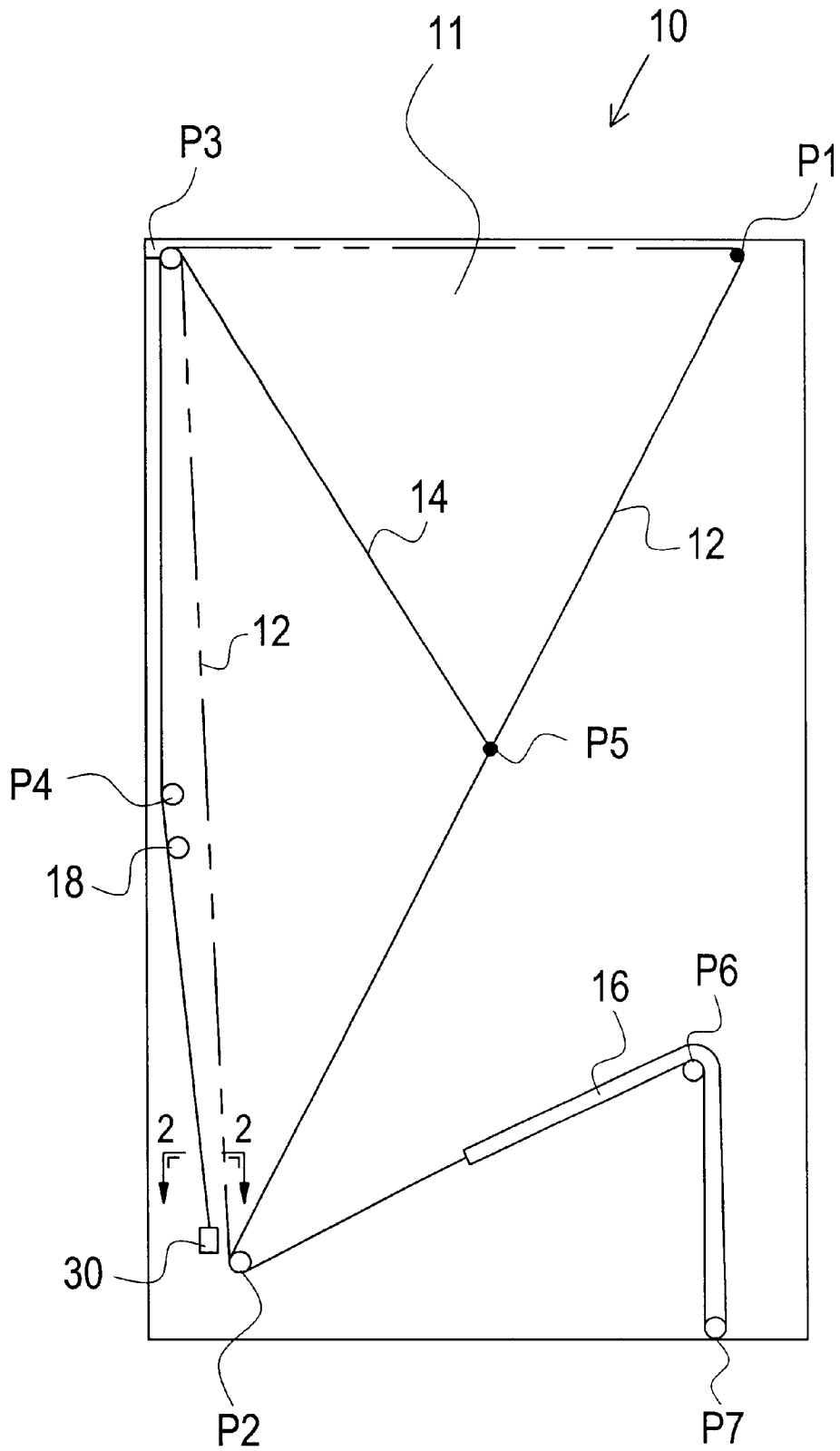
FIG. 1 is a schematic plan view of an installation of a bird removal device made in accordance with the present invention.

FIGS. 1–5 show a first preferred embodiment of a bird removal device 10. In FIG. 1 it can be seen that the device 10 includes a bow string 12, shown in the at-rest position by a solid line and in the "cocked" position by the dashed line. A tow line 14 is secured at one end to the bow string 12 at the point P5, and at the other end to a powered retractor mechanism 30, which will be described in more detail later.

A first end of the bow string 12 is securely fastened to an anchor P1 which is secured to the ground. The bow string 12 is strung around a second anchor P2 which, in this instance, is a pulley. The second end of the bow string 12 is then secured to a spring 16, which, in this embodiment, extends around a pulley P6 and is anchored to the ground at the point P7. The spring 16 may be a simple coil spring, a bungee cord, or even a flexible rod such as a fiberglass rod, and serves as a non-powered retractor. For some spring arrangements, the pulley P6 would be omitted. The spring 16 stretches to allow the bow string 12 to travel from its "at rest" position (shown in solid line) to its "cocked" position (shown in broken line), and then the spring force swiftly returns the bow string 12 to its "at rest" position when the tow line is released, and, in so doing, causes the bow string 12 to sweep across the perching surface 11 where the birds perch.

The tow line 14 is secured at its first end P5 to the bow string 12. The tow line 14 then extends around a anchor point P3 (which in this instance is a pulley), and may work its way around other pulleys P4 before its second end is secured to the retractor mechanism 30, which is itself also secured to the ground.

Once the retractor mechanism 30 is engaged, the second end of the tow line 14 is wound up onto a wind-up spool (this mechanism is described later), and thus the first end of the tow line 14 is pulled toward the anchor point P3. Since the bow string 12 is attached to the tow line at point P5, as the first end of the tow line is pulled toward anchor point P3, so is the point P5 on the bow string 12 also pulled toward the anchor point P3.

When the point P5 reaches the point P3, the bow string 12 is stretched in the cocked position shown in broken line. At this point, a mechanical stop (described later) prevents the tow line 14 from winding up any further, and the retractor stops pulling on the tow line 14. The bow string 12 is now cocked. When the tow line 14 is released (described later), the bow string 12 is free to return to its "at rest" position, and it is urged to do so very quickly by the tension exerted by the spring 16 on the bow string 12. As the bow string 12 snaps back to its "at rest" position shown in solid line, it sweeps an area defined by the points P1, P2, and P3, thus physically removing any birds which may be perched within the area 11 being swept by the bow string 12.

Once the bow string 12 has snapped back to its "at rest" position, the retractor mechanism 30 starts retracting the tow line 14 once again, so as to bring the bow string 12 back in the cocked position (shown in broken line). As it does so, the bow string 12 once again sweeps the area 11 defined by the points P1, P2, and P3, and, while it does so, the retractor mechanism 30 emits a clicking sound which also further contributes to scare any birds away. Thus, not only are birds physically dislodged by the bow string 12 as it snaps to its "at rest" position; the return sweep will also dislodge any birds which may have flown right back to their perch 11, and the commotion of all the birds being physically dislodged, together with the clicking sound emitted by the retractor mechanism 30, will serve to remove unwanted birds, not only in the area 11 which was swept by the bow string 12, but also in the vicinity of this same area 11.

Figure 2:
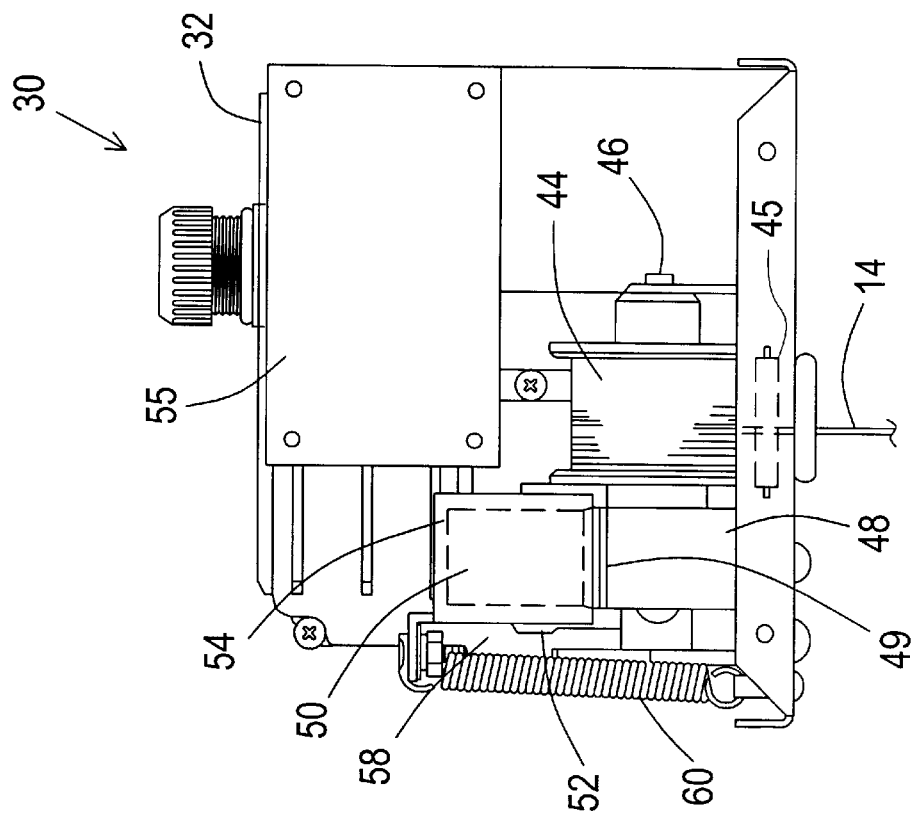
FIG. 2 is a view, taken along the line 2—2 of FIG. 1, showing the mechanical retractor used to pull in the tow rope (with its cover removed)
Figure 3:
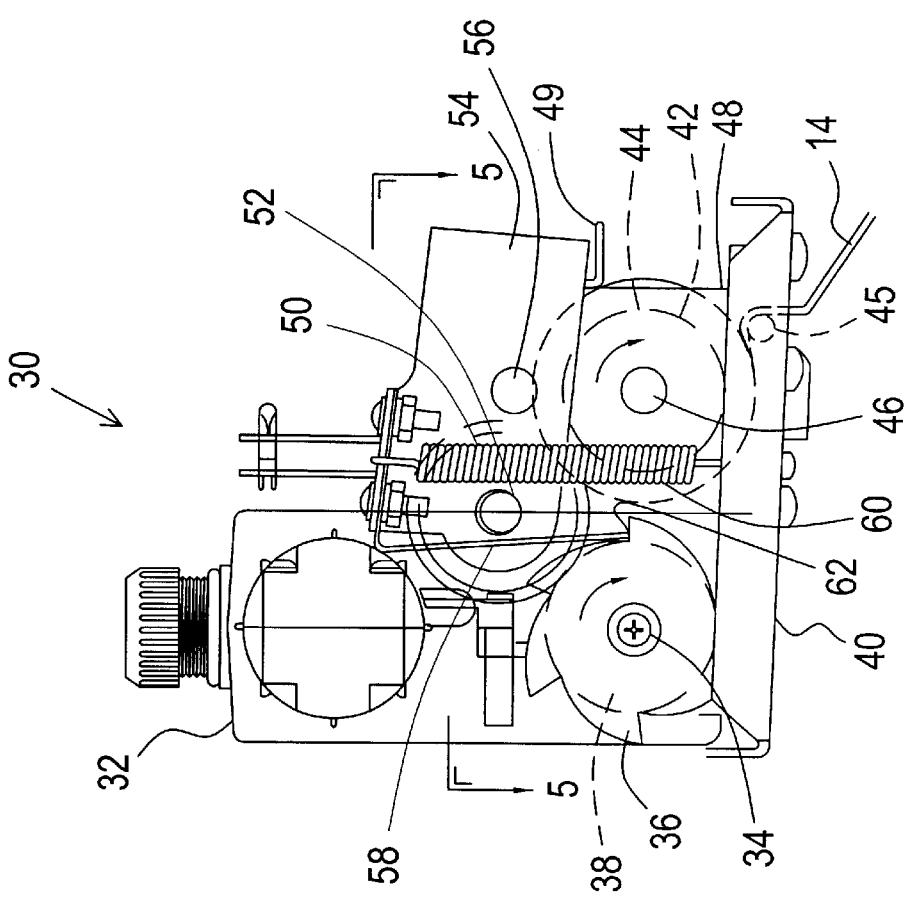
FIG. 3 is a front end view of the mechanical retractor of FIG. 2 (taken from the left side of FIG. 2, again with the cover removed)

FIGS. 2 and 3 show a side view and a front end view, respectively, of the retractor mechanism 30 of the present invention, which is intended to be enclosed in a box (not shown). The retractor 30 includes a small electric motor 32 with an output shaft 34. A circuit board 55 serves as the controller to control the motor 32. Mounted coaxially on this output shaft 34 are a ratchet wheel 36, and a first friction wheel 38 which is parallel to and directly behind the ratchet wheel 36 as seen in FIG. 3. The ratchet wheel 36, the friction wheel 38, and the output shaft 34 of the motor 32 all rotate as a single unit about the axis 34A, and this entire assembly is mounted as a single item onto a platform or base 40.

Figure 5:
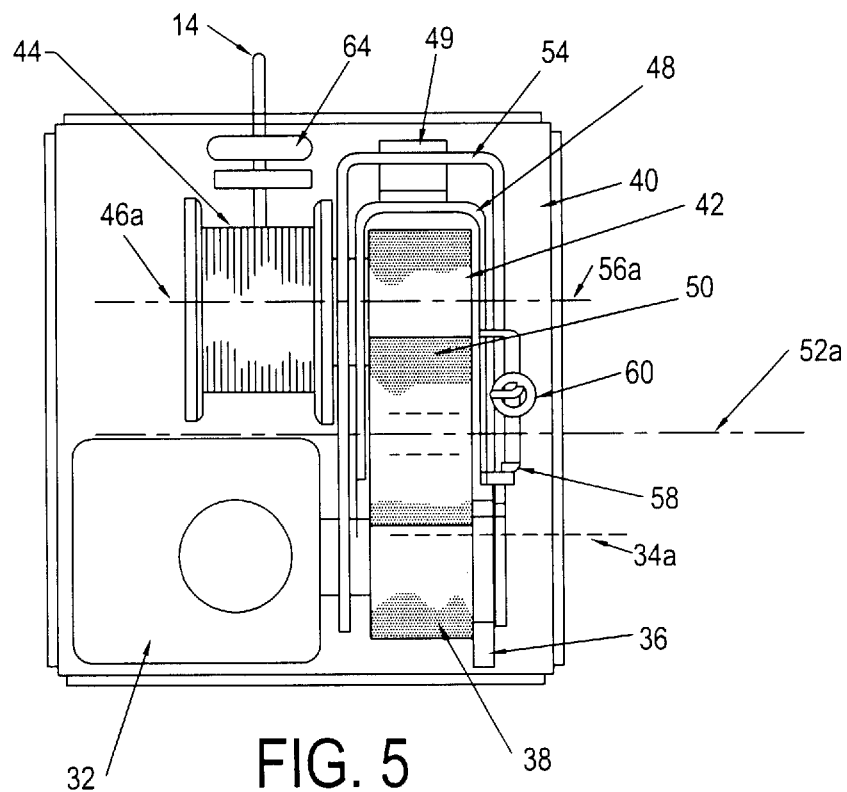
FIG. 5 is a view taken along line 5—5 of FIG. 3.

A second friction wheel 42 (which is identical to the first friction wheel 38) and a wind-up spool 44 are mounted on a common shaft 46, and they also rotate as a single unit about an axis 46A. This second friction wheel assembly is mounted as a single item onto a subframe 48, which in turn is fixed to the base 40 and is placed so that the output shaft 34 of the motor 32, and the shaft 46 of the second friction wheel assembly are both parallel and in spaced apart relationship to each other, and the first and second friction wheels 38 and 42 respectively are radially aligned with each other, as shown in FIG. 5. Thus, the first and second friction wheel assemblies 38, 42 rotate about parallel axes of rotation 34A, 46A, which are fixed relative to the base 40.

Figure 4:
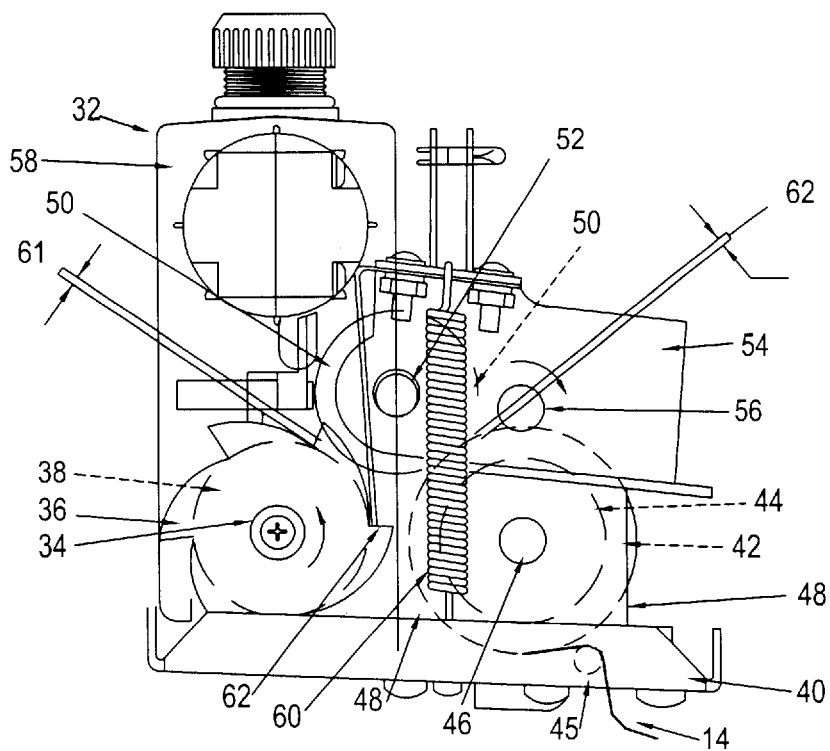
FIG. 4 is the same view as that of FIG. 3, except that the retractor is in the position which allows "free wheeling" of the wind-up spool.

The subframe 48 is a U-shaped wall (as seen in FIG. 5) and has a fixed arm 49 projecting horizontally outwardly (as seen in FIGS. 3–5), the purpose of which will be explained later. The tow line 14 is attached at one end to the wind-up spool 44 such that, when the wind-up spool turns clockwise (as shown by the arrow in FIG. 3) the tow line 14 passes over a support roll 45 and is wound onto the wind-up spool 44. Naturally, as the wind-up spool 44 turns counterclockwise, the tow line 14 unwinds from the wind-up spool 44.

A third friction wheel 50 is rotatably mounted, via an axle 52, to a pivoting frame 54, so as to rotate about an axis 52A. The pivoting frame 54 is pivotally mounted to the subframe 48 via a pivot axle 56, which is directly above the second friction wheel axle 46, such that the pivoting frame 54 is free to pivot about a pivot axis 56A relative to the fixed base 40. The pivot frame 54 may pivot clockwise as seen from the vantage point of FIG. 3 until the pivot frame 54 hits the outwardly projecting arm 49 of the subframe 48, which then acts as a stop to prevent further rotation of the pivot frame 54.

The axle 52 of the third friction wheel 50 is located above and parallel to the shafts 34 and 46 of the first and second friction wheels 38, 42, and all three friction wheels 38, 42, 50 are radially aligned, as shown in FIG. 5, with the third friction wheel 50 located above and between the first and second friction wheels 38, 42. When the pivot frame 54 pivots counterclockwise (as seen from the vantage point of FIG. 3), the tread surface of the third friction wheel 50 comes to rest upon, and is in frictional contact with, the tread surfaces of both the first and second friction wheels 38, 42, as shown in FIG. 3. The tread surfaces of the friction wheels 38, 42, 50 preferably are all made from a 60A Shore hardness urethane material called K•Prene, Grade K-66A, available from Acrotech, 980 West Lakewood Ave. Box 466, Lake City, Minn. 55041. This material is the correct hardness to provide good frictional contact between the friction wheels 38, 42, 50.

A downwardly projecting ratchet lever arm 58 and a spring 60 are both mounted to the pivot frame 54 on the same side as the third friction wheel 50, relative to the pivot axis 56A. The spring 60 extends from the pivot frame 54 to the base 40 and provides a force which pushes the tread surface of the third friction wheel 50 against the tread surfaces of the first and second friction wheels 38, 42. The ratchet lever arm 58 extends downwardly from the pivot frame 54 and comes to rest against the teeth 62 of the ratchet wheel 36 such that, as the ratchet wheel 36 turns clockwise, the lever arm 58 clicks against the ratchet teeth 62. However, when the ratchet wheel 36 turns counterclockwise, the lever arm 58 locks into one of the ratchet teeth 62, and the ratchet wheel 36 pushes the lever arm 58 up, forcing the pivot frame 54 to pivot clockwise until the pivot frame 54 hits the outwardly projecting arm 49 of the subframe 48. At this point, as shown in FIG. 4, the third friction wheel is lifted up out of contact with the first and second friction wheels 38, 42, and the ratchet wheel 36 is prevented from further rotation in the counterclockwise direction. A small gap G1 is formed between the first friction wheel 38 and the third friction wheel 50, and a small gap G2 is formed between the second friction wheel 42 and the third friction wheel 50.

When the third friction wheel 50 (which we now refer to as the idler wheel 50) is raised so that there is no frictional contact between the three friction wheels 38, 42, 50, then the idler wheel 50 and the second friction wheel 42 are able to freewheel. The tow line 14, which is wound around the wind-up spool 44, is now free to unwind as the wind-up spool freewheels with the now freewheeling second friction wheel 42. The tow line 14 is secured to the bow string 12 at point P5, and the bow string wants to snap back to its "at rest" position thanks to the force exerted by the spring 16. With the resistance from the friction wheels 38, 42, 50 now removed, the bow string snaps back to its "at rest" position, pulling the tow line 14 with it and unwinding the tow line 14 from the wind-up spool 44.

Referring now also to FIG. 4, upon receipt of a signal from the controller, the motor 32 begins counterclockwise rotation, engaging the lever arm 58 with the ratchet teeth 62 such that the lever arm 58 is raised and the pivot frame 54 pivots clockwise until the pivot frame 54 is stopped by the arm 49 projecting from the subframe 48. The pivoting action of the pivot frame 54 is enough to lift the third friction wheel 50 away from its normal frictional contact with the other two friction wheels 38, 42 as described earlier. The controller may be triggered manually by an operator, by a timer, a motion sensor, a heat sensor, or even a sound sensor, or by other known methods.

After a short period of time (2.5 seconds in the present embodiment), the controller signals the motor 32 to stop counterclockwise rotation and to begin rotation in a clockwise direction. The lever arm 58 is now disengaged, and the spring 60 rotates the pivot frame 54 counterclockwise, and with it moves the idler wheel 50 downwardly so that the gaps G1 and G2 are eliminated and all three friction wheels 38, 42, 50 are once again in frictional contact at their respective tread surfaces. As the motor 32 turns clockwise, it turns the first friction wheel in the same direction, which turns the idler wheel 50 counterclockwise, which turns the second friction wheel 42 in a clockwise direction, thus also turning the wind-up spool 44 and causing the tow line 14 to wind up onto the spool 44. As the tow line 14 is wound onto the wind-up spool 44, it is retracting the other end of the tow line 14, and with it the bow string 12 until it is back in the cocked position (shown in broken line). At this point, a detent 18 (which in this case is an enlargement such as a ring or a knot secured to the tow line 14 and which is too large to fit through the opening 64 where the tow line 14 enters the retractor mechanism 30) stops the tow line 14 from winding any further onto the wind-up spool 44, and the retractor mechanism 30 stalls and stops, leaving the bow string cocked and ready to repeat the cycle upon receipt of a new signal from the controller.

Thus, the bow string 12 normally sits in the cocked position (shown in broken line in FIG. 1) ready to snap back to its "at rest" position (shown in solid line), urged there by the spring 16. When a signal is received at the motor 32, the initial counterclockwise rotation allows the wind-up spool 44 to freewheel, effectively releasing the tow line 14 and thus allowing the bow string 12 to snap back to its "at rest" position, and in the process sweeping the area 11 so as to physically remove any birds perched therein. After a short period of time, the controller signals the motor 32 to reverse direction and the motor 32 rotates clockwise. The lever arm 58 clicks as each ratchet tooth 62 passes under the lever arm 58, and the spring 60 pulls the friction wheels together so that the wind-up spool 44 is once again reeling in the tow line 14. As the tow line 14 is retracted, it pulls the bow string 12 back over the area 11 to be protected from perching birds, accompanied this time by the clicking sound of the lever arm.

Figure 6:
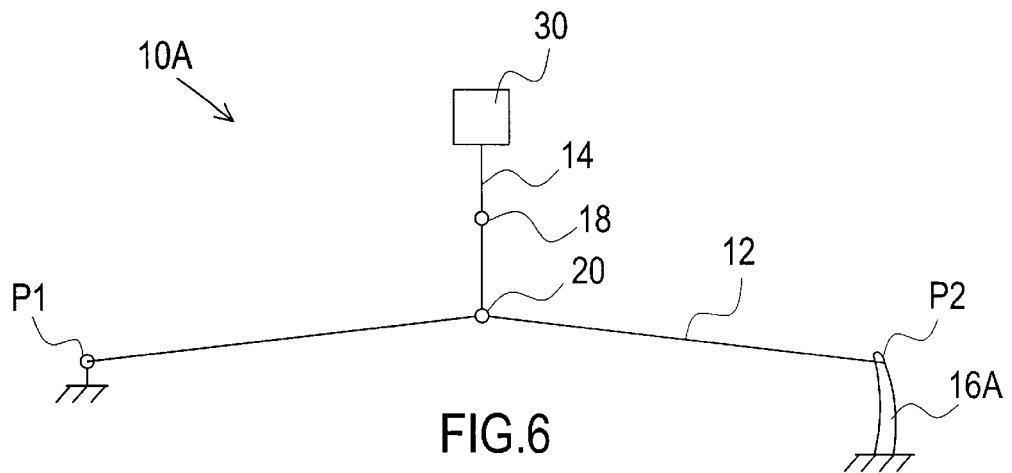
FIG. 6 is a schematic plan view of a second embodiment of a bird removal device made in accordance with the present invention.

FIG. 6 is a schematic view of a second embodiment of the present invention. This arrangement 10A is very similar to the arrangement of the first embodiment 10 shown in FIG. 1, except that the bow string 12 is urged back to its "at rest" position by a flexible rod 16A (such as a fiberglass rod) instead of by the spring 16 of FIG. 1.

Figure 7:
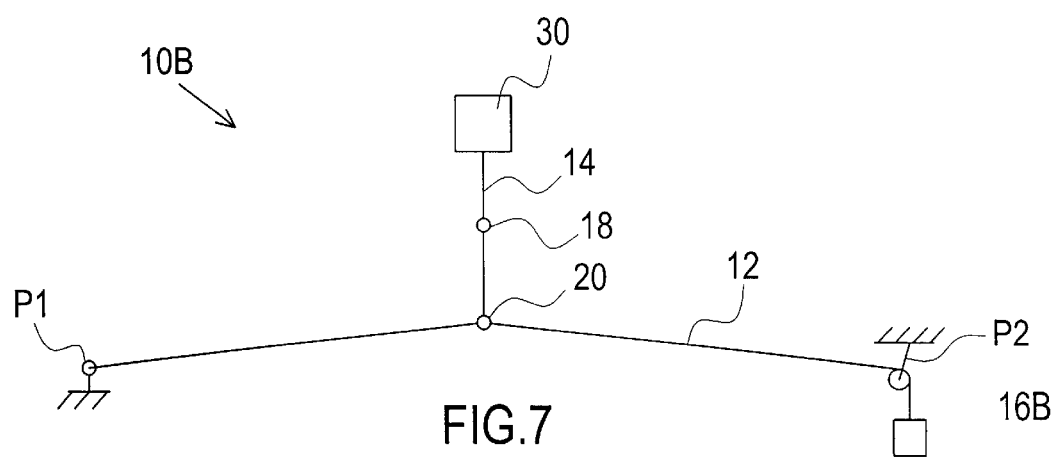
FIG. 7 is a schematic plan view of a third embodiment of a bird removal device made in accordance with the present invention.

FIG. 7 is a schematic view of a third embodiment of the present invention. This arrangement 10B is very similar to the first embodiment shown in FIG. 1, except that the bow string 12 is urged back to its "at rest" position by a weight 16B acting over a pulley P2 instead of by the spring 16 of FIG. 1.

Figure 8:
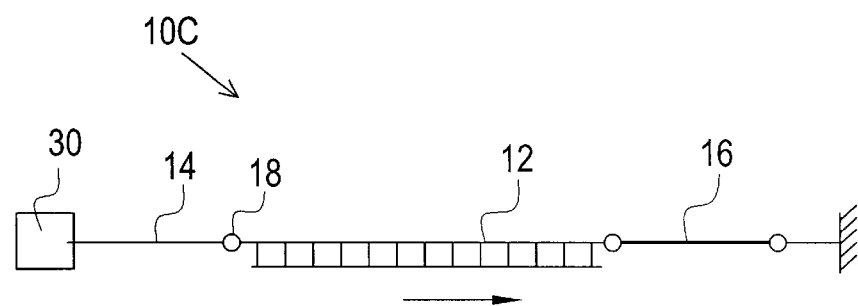
FIG. 8 is a schematic plan view of a fourth embodiment of a bird removal device made in accordance with the present invention.

FIG. 8 is a schematic view of a fourth embodiment 10C of the present invention. This is similar to the first embodiment shown in FIG. 1 except that in this embodiment the tow line 14 is directly in line with the bow string 12 (and in fact may be the end portion of the bow string itself), and the sweeping action of the bow string 12 is in line with the motion of the tow line 14 instead of being generally perpendicular to the motion of the tow line 14 as in the previous embodiments. To accomplish this, the tow line 14 is attached to and end of the bow string 12, instead of to a point in between the two end points of the bow string 12. In this fourth embodiment, the bow string 12 includes a tinsel cord, used to cause additional motion and noise among the birds. As discussed earlier, tinsel cord may be used interchangeably with the bow string 12 in many of the embodiments of the present invention.

Figure 9:
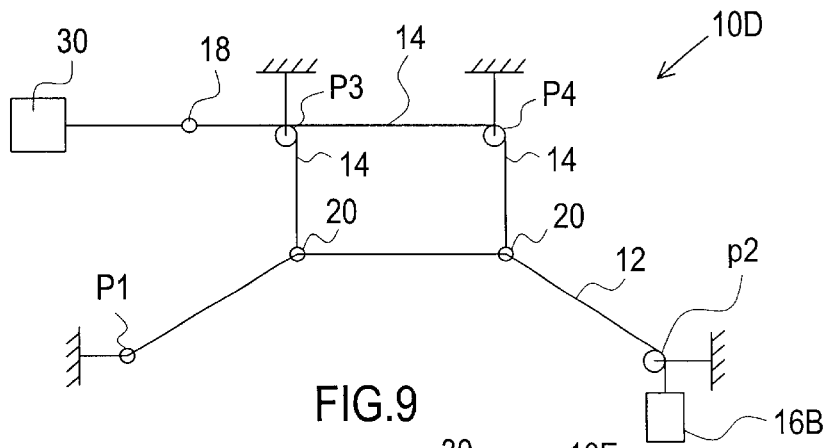
FIG. 9 is a schematic plan view of a fifth embodiment of a bird removal device made in accordance with the present invention.

FIG. 9 is a schematic view of a fifth embodiment 10D of the present invention. This is very similar to the third embodiment 10B shown in FIG. 7, except that the bow string 12 is connected to the tow line 14 at two different points via the rings 20. When the tow line 14 is fully retracted so that the rings 20 are up against the pulleys P3 and P4, then the area to be swept by the bow string 12, when it is released, is a quadrangle defined by the points P1, P2, P3, and P4, instead of the triangular shaped areas swept by the first, second, and third embodiments. In fact, many differently-shaped areas may be swept by the release of the bow string 12, depending on the location and number of tow lines 14 and pulleys 20 used.

Figure 10:
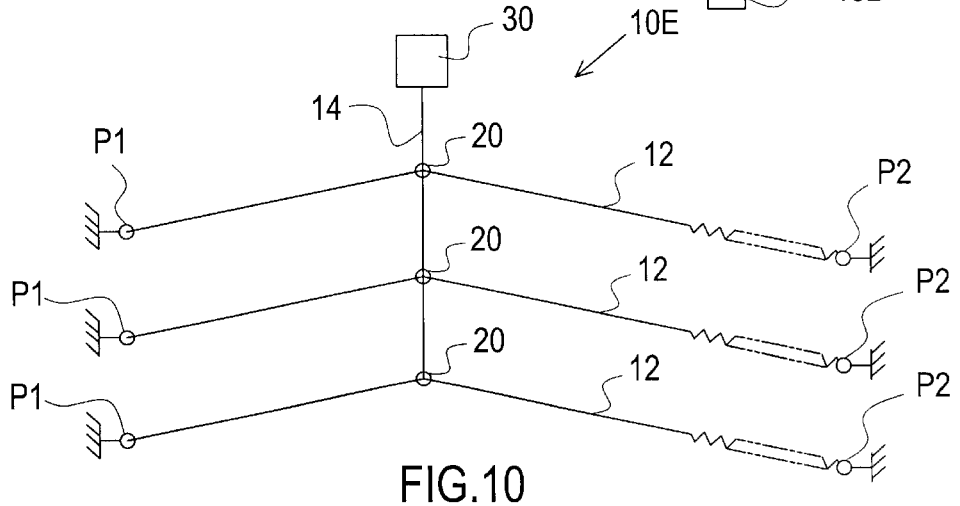
FIG. 10 is a schematic plan view of a sixth embodiment of a bird removal device made in accordance with the present invention, showing multiple sweep lines.

FIG. 10 is a schematic view of a sixth embodiment 10E of the present invention. This is very similar to the first embodiment shown in FIG. 1, in that a spring 16 is attached to one end of the bow string 12. The most important difference between this sixth embodiment and the first embodiment is that there are multiple bow strings 12 secured to multiple anchor points P1 and P2, and these multiple bow strings 12 are secured to a common tow line 14. As the tow line 14 is retracted by the retractor mechanism 30, the tow line 14 will pull and cock the multiple bow lines 12. When the tow line 14 is released, the multiple bow strings 12 simultaneously sweep multiple bird perching areas.

Figure 11:
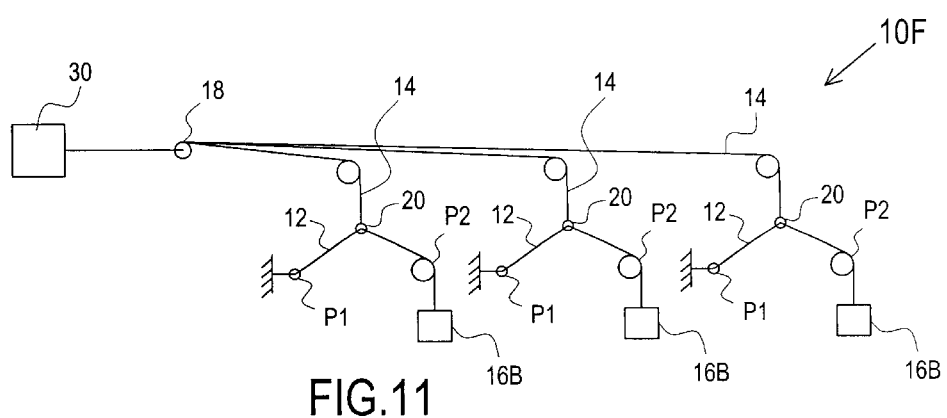
FIG. 11 is a schematic plan view of a seventh embodiment of a bird removal device made in accordance with the present invention, showing multiple sweep lines.

FIG. 11 is a schematic view of a seventh embodiment 10F of the present invention. This is very similar to the sixth embodiment shown in FIG. 10 in that there are multiple bow strings simultaneously sweeping multiple bird perching areas, except that there are now multiple tow lines 14, each connected to its own bow string 12, and the multiple tow lines 14 come together at one point 18, where they join together before going to the retractor mechanism 30. As in the case of the sixth embodiment, as the tow line 14 is retracted by the retractor mechanism 30, the tow line 14 will pull and cock the multiple bow lines 12. When the tow line 14 is released, the multiple bow strings 12 simultaneously sweep multiple bird perching areas.

Figure 12:
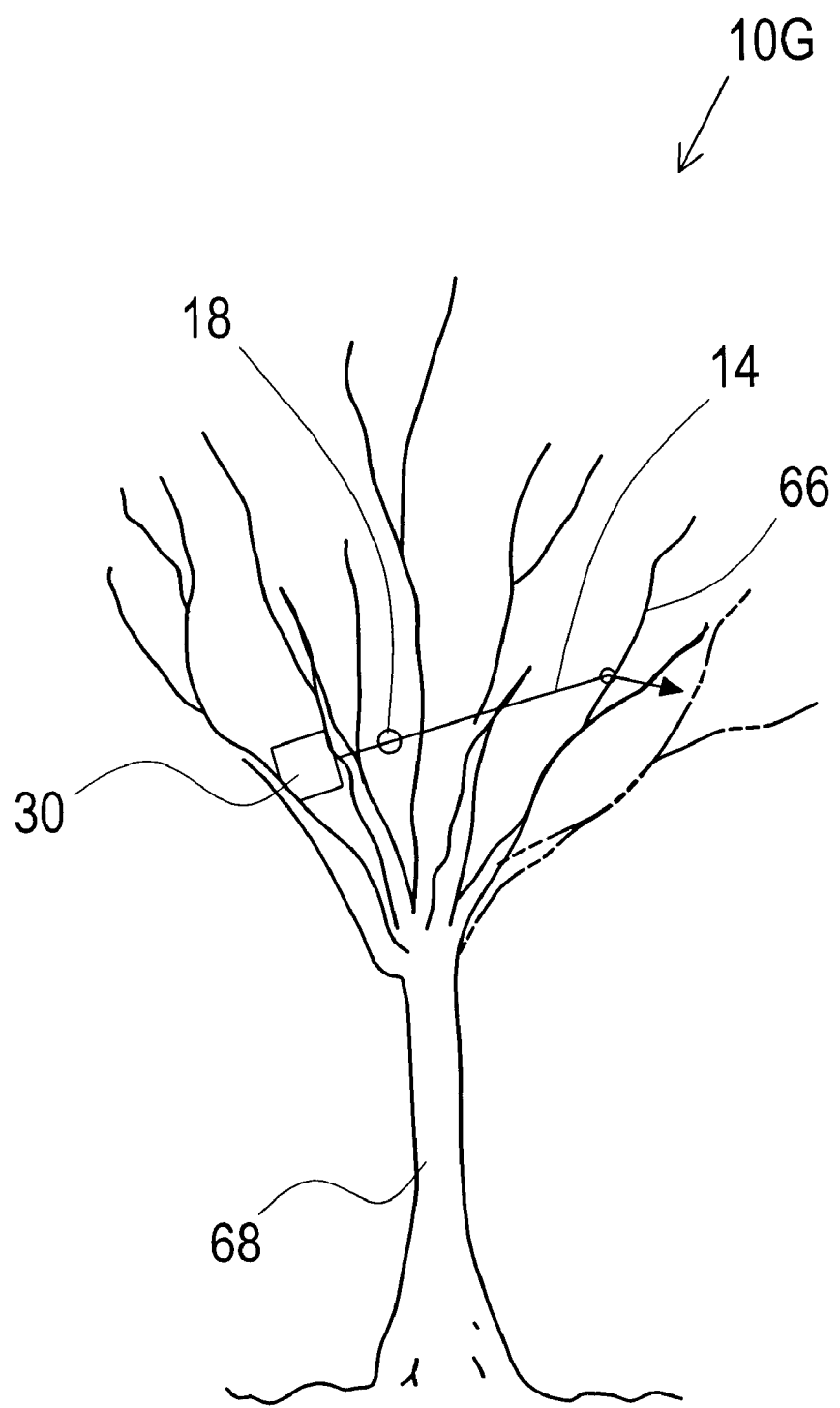
FIG. 12 is a schematic plan view of an eighth embodiment of a bird removal device made in accordance with the present invention, showing the shaking of tree limbs.

FIG. 12 is a schematic view of an eighth embodiment 10G of the present invention. In this instance there is no bow string. Instead, the tow line 14 is attached to a branch 66 of a tree 68. The branch 66 is shown in solid line as it is being pulled back into the cocked position by the tow line 14 which is connected to the retractor mechanism 30. The branch 66 itself serves the function of the bow string 12 and spring 16 of the first embodiment. When the tow line 14 is released, the branch 66 will swing back to its "at rest" position shown in dotted line, and thus will scare away any birds perched on the branch 66 as well as in any neighboring branches of the tree 68. Thus, in this instance, the bird removal device is acting, not by sweeping a bow string over a perching surface, but rather by actually moving the perching surface itself.

Figure 13:
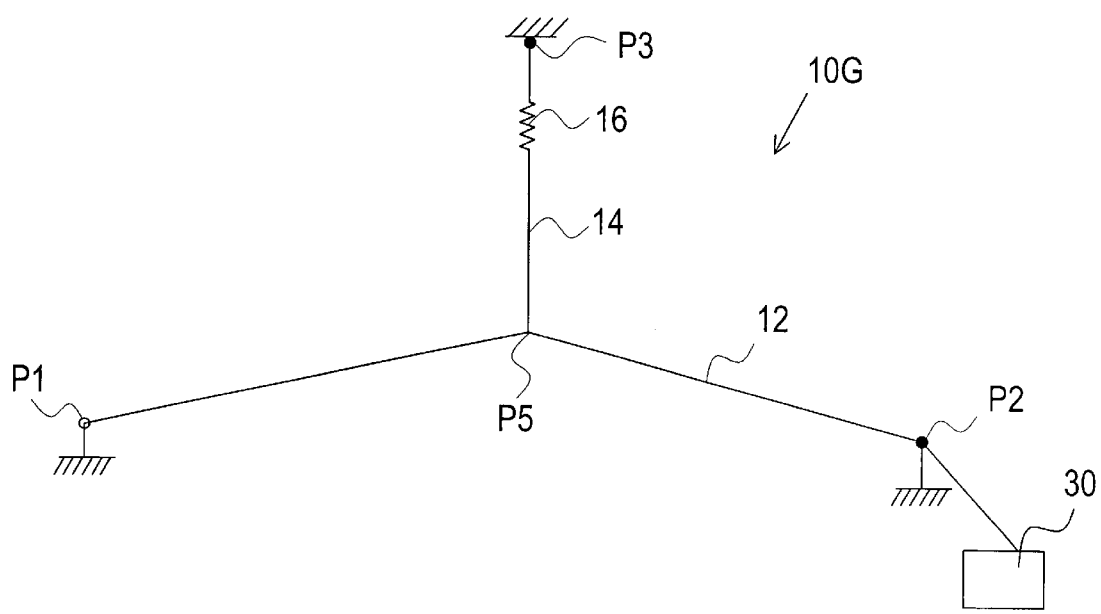
FIG. 13 is a schematic plan view of a ninth embodiment, in which the tow cord is retracted by a non-powered retractor, and the bow string 12 is retracted by a powered retractor.

FIG. 13 shows another alternative embodiment 10G, in which the bow string 12 is secured at one end to a point P1, passes over a pulley P2, and winds onto the wind-up spool of the powered retractor mechanism 30. The tow line 14 is secured to the bow string 12 at the point P5, to an end point P3, and includes a spring 16. So, in this case, the "at rest" position is when the spring 16 is retracted and the bow string 12 is extended, and the "cocked" position is when the bow string 12 is retracted onto the powered retractor 30 and the spring 16 is extended.

It may be noted that, in many of the embodiments, the tow line 14 may be attached to the bow string 12 or tinsel cord by use of a ring which will then allow the tow line 14 to automatically find its best point to pull on the bow string 12. In some instances this same ring 20 may serve the dual purpose of acting as a detent 18.

It will be obvious to those skilled in the art that modifications may be made to the embodiments described above without departing from the scope of the present invention.

What is claimed is:

1. A bird removal device for removing birds from a perching surface, comprising:
   first and second anchor points defining a line substantially parallel to said perching surface;
   a cord to sweep horizontally across the perching surface, said cord defining a first, released position, and a second, cocked position, one of said positions being when said cord is extending taut between said first and second anchor points;
   a powered retractor, connected to said cord so as to pull said cord to its second, cocked position; and
   a non-powered, mechanical retractor, which pulls said cord to its released position when the powered retractor is released.

2. A bird removal device as recited in claim 1, wherein said non-powered retractor includes a weight attached to said cord.

3. A bird removal device as recited in claim 1, wherein said non-powered retractor includes a spring attached to said cord.

4. A bird removal device as recited in claim 1, wherein said non-powered retractor includes at least part of the cord being made of an elastic material.

5. A bird removal device as recited in claim 3, wherein said spring is attached to one end of said cord.

6. A bird removal device as recited in claim 1, wherein said powered retractor is connected to an intermediate point on said cord, and said released position is the position taut between the first and second end points.

7. A bird removal device as recited in claim 1, wherein said powered retractor is connected to an end of said cord, and said cocked position is where said cord is taut between first and second end points.

8. A bird removal device as recited in claim 3, wherein said spring is a coil spring.

9. A bird removal device as recited in claim 3, wherein said spring is a flexible rod.

10. A bird removal device for driving birds off a substantially horizontal perching surface, comprising:
    a powered retractor, including a motor; a wind-up spool driven by said motor; and a release, which permits the wind-up spool to freewheel;
    a cord, mounted substantially parallel to and within one foot of said perching surface, wherein said powered retractor, when activated, pulls said cord to a first position; and
    a spring, which pulls said cord to a second position when said wind-up spool is freewheeling, so as to cause said cord to sweep across said perching surface.

11. A bird removal device as recited in claim 10, wherein said spring is a portion of said cord itself.

12. A bird removal device as recited in claim 10, wherein said spring is attached to an end of said cord.

13. A bird removal device as recited in claim 10, wherein said powered retractor includes a first drive wheel connected to a power source, a second driven wheel connected to said wind-up spool, and a third idler wheel, wherein said first drive wheel drives said second driven wheel through said third idler wheel.

14. A bird removal device as recited in claim 13, wherein said first wheel is fixed to a drive shaft which is also fixed to a ratchet wheel and to a reversible motor, said drive shaft defining a first axis which is fixed relative to a base, said second wheel is fixed to a driven shaft which is also fixed to said wind-up spool, said driven shaft defining a second axis which is also fixed relative to said base and which is in spaced apart and substantially parallel relation to said first axis; and said third idler wheel mounted on an idler shaft substantially parallel to and in spaced apart relation to said first and said second axes, and mounted on a pivot frame which is pivotally mounted to said base, such that said pivot frame has a first position in which said third wheel is in frictional contact with said first and second wheels, and a second position in which said third wheel allows said second wheel to freewheel.

15. A bird removal device as recited in claim 14, wherein said pivot frame includes an arm disposed to engage said ratchet wheel so as to pivot said pivot frame to said second position when said reversible motor rotates in a first direction, and a spring mechanism disposed to pivot said pivot frame to said first position when said reversible motor rotates in a second direction.

16. A bird removal device for removing birds from a surface, comprising:

first and second anchor points;

a cord to sweep across the surface, said cord defining a first, released position, and a second, cocked position, one of said positions being when said cord is extending taut between said first and second anchor points;

a powered retractor, connected to said cord so as to pull said cord to its second, cocked position; and a non-powered, mechanical retractor, which pulls said cord to its released position when the powered retractor is released, wherein said powered retractor includes a driven spool and a tow line with first and second ends, said first end being secured to said cord, and said second end being secured to said driven spool such that, when said driven spool rotates, said tow line winds up onto said driven spool, pulling said cord to its second, cocked position.

17. A bird removal device as recited in claim 16, including a release mechanism which disengages said driven spool from its drive to allow said driven spool to freewheel.

* * * * *